United States Patent Office 3,763,077
Patented Oct. 2, 1973

3,763,077
METHOD FOR THE ANIONIC POLYMERIZATION OF EPSILON-CAPROLACTAM IN THE PRESENCE OF A PLASTICIZER
Elio Eusebi, Troy, and Joseph B. Nowell, Highland Park, Mich., assignors to General Motors Corporation, Detroit, Mich.
No Drawing. Filed Feb. 22, 1971, Ser. No. 117,754
Int. Cl. C08g 20/18, 20/38, 51/34
U.S. Cl. 260—33.2 R    3 Claims

ABSTRACT OF THE DISCLOSURE

Low temperature anionic polymerization of epsilon-caprolactam, using polymethylene polyphenyl isocyanate as cocatalyst, is conducted in the presence of certain polyoxyalkylene polyol plasticizers to form a plasticized, relatively high impact strength nylon-6.

---

This invention relates to the anionic polymerization of epsilon-caprolactam (hereinafter "caprolactam") to produce a relatively high impact strength nylon-6. More particularly, this invention relates to an anionic polymerization process for caprolactam conducted in the presence of certain effective plasticizers which do not inhibit the polymerization reaction.

The polymerization of lactam monomers to polyamides has been known for many years. Perhaps most common is the polymerization of caprolactam to nylon-6. At first the polymerization was undertaken at high temperatures, above the melting point of the polymeric product, and required several hours for completion. Some time ago, however, it was discovered that caprolactam could be rapidly polymerized at a temperature above its melting point but below the melting point of the resulting nylon-6. This was accomplished by using a lactam-base salt as catalyst and a suitable cocatalyst which served to activate and open the relatively stable caprolactam ring thereby effecting polymerization at temperatures in the region of 150° to about 200° C. This type of caprolactam polymerization is known as low temperature anionic polymerization. The resulting polymer is highly crystalline. It is difficult to plasticize nylon-6 polymers to obtain relatively high flexibility and impact strength. In the case of nylon-6, one effective plasticizing material is caprolactam monomer. In practice, the incorporation of the monomer was accomplished by not extracting the residual caprolactam after polymerization reaction had reached equilibrium. However, all polymerization catalysts do not inherently provide an optimum amount of caprolactam monomer for suitable plasticization. In fact, most anionic polymerization formulations inherently result in relatively little unreacted caprolactam monomer in equilibrium with nylon-6 polymer at low temperatures. If it is necessary to add additional caprolactam or remove excess caprolactam an additional expensive processing step is involved.

Some of the higher nylons, such as nylon-11 and nylon-12 are less crystalline than nylon-6. These higher nylons can be plasticized with additives such as certain sulfonamides after the nylons are formed. However, it is found that conventional nylon plasticizers (other than monomeric caprolactam) inhibit the polymerization of nylon-6 if they are incorporated with a liquid monomer mixture in an attempt to simultaneously form and plasticize nylon-6.

It is an object of the present invention to provide a low temperature anionic polymerization formulation and procedure for caprolactam, which may be carried out in the presence of a suitable plasticizer material, without inhibiting the polymerization reaction.

It is another object of the present invention to provide a catalyst-cocatalyst-plasticizer formulation for use in the polymerization of caprolactam at a temperature above its melting point, but below the melting point of the nylon-6 product, to produce a plasticized, relatively high impact strength polymer.

It is a still further object of the present invention to provide a method of simultaneously casting, polymerizing and plasticizing caprolactam to produce a molded, high impact strength nylon-6 article of desired configuration.

In accordance with a preferred embodiment of our invention, these and other objects are accomplished by first providing a solution of a relatively small amount of polymethylene polyphenyl isocyanate cocatalyst, up to about 0.7 mole percent of the caprolactam monomer used, in one portion of the monomer at a temperature of about 140° to 200° C. A suitable base, such as sodium hydride, in a small amount, up to about ten mole percent of the total caprolactam monomer, is dissolved in the balance of the monomer at a like temperature. The base reacts with an equivalent portion of caprolactam to form a caprolactam-base salt with functions as an anionic catalyst. Also added to one of the monomer portions is a small amount, up to no more than about 15% by weight of the caprolactam-catalyst-cocatalyst mixture, of a polyoxyalkylene polyol, taken from the group consisting of polyoxyethylene glycols having a molecular weight of about 6,000 to 20,000, polyoxypropylene glycols having a molecular weight of about 2,000 to 4,000, and block copolymeric polyoxypropylene - polyoxyethylene polyols having a molecular weight of 3,000 to 14,000. After the plasticizer has dissolved in a portion of monomer, the monomer portions are mixed while still at a temperature of about 140° to 200° C. Generally, the monomer mixture is then poured into a mold defining a cavity of suitable predetermined configuration. The mold is preheated to a temperature of 150° to 200° C. After a brief initiation period in which the cocatalyst activates a small portion of lactam molecules, rapid polymerization of the lactam occurs in the presence of a subject plasticizer to form a useful, high impact strength, solid cast polyamide polymer. Under the conditions described the polymerization is substantially complete in a matter of minutes. Generally, the mold and its contents are heated for about four minutes at a temperature of 160° to 200° C., whereupon the cast article may be removed from the mold.

Other objects and advantages of our invention will become more apparent in view of a detailed description thereof which follows.

The polymerization process of this invention rapidly polymerizes caprolactam in the presence of certain specific plasticizers. High molecular weight polyamides, commonly characterized as nylon-6, are produced. The rate of the polymerization is not substantially affected and the properties of the polymer are not adversely affected. In fact, the flexibility and impact strength of the nylon-6 polymer are increased. The polymerization is conducted using a caprolactam-base salt as anionic catalyst together with polymethylene polyphenyl isocyanate cocatalyst at temperatures above the melting point of the lactam monomer, but below the melting point of the resulting nylon-6. In general, this temperature range is from about 150° to 200° C.

Anionic catalysts used in the polymerization of caprolactam monomers are the reaction product of a strong base with caprolactam. The strong base used to form the caprolactam-base anionic catalyst may be an alkali metal, an alkaline earth metal or a strong basic compound of one of these metals, such as one of the respective alkali or alkaline earth hydroxides, alkoxides, hydrides, amides, alkyls or aryls. These bases are strong enough to convert caprolactam to its basic iminium salt. Accordingly, sodium metal, lithium metal, potassium metal, calcium metal, sodium hydride, lithium hydride, sodium hydroxide, potassium hydroxide, lithium hydroxide, calcium hydroxide, magnesium hydroxide, sodium methoxide, sodium methyl, sodium amide, sodium phenyl and the like are examples of suitable strong bases for the preparation of the anionic catalyst. The lactam-base anionic catalyst is prepared by mixing caprolactam with a strong base at a temperature between about 80° and 200° C. and adjusting the temperature of the mixture to the desired polymerization temperature, or by addition of the strong base to caprolactam at the desired polymerization temperature. The use of sodium hydride as a strong base is preferred because of its availability, ease of handling and because the byproduct of its reaction with caprolactam is inert hydrogen gas.

Preferably, caprolactam and likewise the base with which it is reacted are substantially anhydrous. The amount of the base employed is about 0.1 to about ten mole percent of the amount of the caprolactam monomer to be polymerized. Higher proportions of base to caprolactam produce lower molecular weight nylon-6. Optimum proportions of catalyst to monomer for most purposes in the practice of our process are from about 0.1 to seven mole percent of the strong base based on the weight of the monomer. An inert gas, such as nitrogen, may be bubbled through the molten caprolactam during the dissolution and reaction of the base with the caprolactam to prevent oxidation and the assist in carrying away any low molecular weight materials, such as hydrogen or water, which may be formed by the reaction of a particular strong base with the caprolactam.

The suitable cocatalyst for use in the practice of our process is polymethylene polyphenyl isocyanate. It has the general structural formula illustrated as follows:

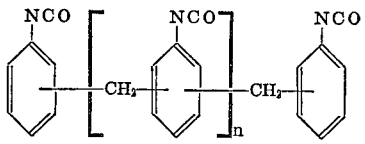

The average value of $n$ is 1. In general, therefore, this polyisocyanate is a trifunctional isocyanate. It may be obtained from the Upjohn Company under the trademark "PAPI." Preferably, in accordance with our invention the PAPI cocatalyst is employed in amounts to provide about 0.1 to two equivalents of isocyanate based on the amount of caprolactam monomer used. The PAPI is dissolved in a portion of monomer, preferably separate from that portion in which the base is dissolved, at a temperature of about 140° to 190° C. An inert gas, such as nitrogen, may be bubbled through the molten caprolactam during the dissolution of the PAPI to prevent oxidation. The PAPI reacts with an equivalent portion of caprolactam to form an adduct in which the lactam ring is more readily opened by the catalyst for subsequent polymerization.

The polyoxyalkylene polyols suitable for use as plasticizers in accordance with our invention are polyoxyethylene glycols, commonly known as polyethylene glycols, $$HO-CH_2-CH_2(O-CH_2-CH_2)_nOH$$

having molecular weights in the range of about 6,000 to 20,000; polyoxypropylene glycols, commonly known as polypropylene glycols,

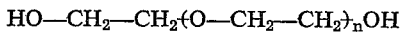

having molecular weights in the range of about 2,000 to 4,000; and those glycols and higher polyols that are block copolymers of ethylene oxide and propylene oxide having molecular weights of about 3,000 to 14,000. Preferably these block copolymer polyols are of the following glycol type:

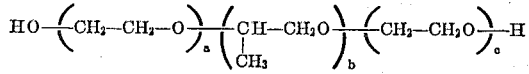

These block copolymeric glycols are commercially prepared by first adding propylene oxide to the two hydroxyl groups of a propylene glycol nucleus. This portion of the ultimate block copolymer can be made to any controlled chain length varying from 800 to several thousand in molecular weight. Ethylene oxide is then added in controlled amounts to both ends of the polyoxypropylene glycol moiety to put polyoxyethylene groups on the ends of the molecule. The two polyoxyethylene blocks may constitute from 10% to 80% by weight of the final copolymer glycol molecule. Suitable members of this class of block copolymeric glycols are available from Wyandotte Chemicals Corporation under the trade name "Pluronic."

The following table summarizes examples of suitable block polyoxyalkylene copolymer glycols of the type described above.

| Trade designation of specific pluronic materials | Percent by weight of the polyoxyethylene groups | Total molecular weight of the glycol |
| --- | --- | --- |
| F68 | 80 | 8,750 |
| F88 | 80 | 11,250 |
| F98 | 80 | 13,750 |
| L101 | 10 | 3,620 |
| L92 | 20 | 3,440 |
| L121 | 10 | 4,440 |
| L122 | 20 | 5,000 |
| L123 | 30 | 5,720 |

The above polyoxypropylene-polyoxyethylene block copolymeric glycols have been found suitable as plasticizers for use in the practice of our process. They are employed in small amounts, preferably 5% to about 15% by weight of the reactive formulation. Preferably they are dissolved in one of the monomer portions with which either the catalyst or cocatalyst has been reacted. Dissolution of the plasticizer in a portion of the monomer to be polymerized is usually readily accomplished by heating the mixture at a temperature of 140° to to 190° C.

Another suitable class of polyoxypropylene-polyoxyethylene block copolymer polyols are of the type represented by the following structural formula:

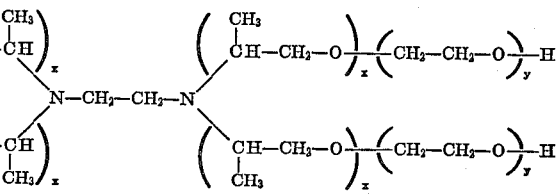

Members of this class of block copolymeric polyols containing from 10% to 80% by weight polyoxyethylene moiety and having a molecular weight from about 3,000 to 14,000 may be employed as suitable plasticizers. They are available commercially from Wyandotte Chemicals Corporation under the trade name "Tetronic." As with the glycol block copolymers described above, these tetrafunctional polyols are dissolved in a portion of the monomer prior to polymerization by heating at a temperature of 140° to 190° C.

In general, with respect to each of the polyoxyalkylene polyols described above, the molecular weight ranges are critical with respect to the suitable practice of our invention. If polyols having molecular weights lower than the average values specified above are employed, the polyol usually inhibits the polymerization reaction. Polyols having higher molecular weights typically are not readily compatible with the monomer or the polymeric product.

A few specific examples will further illustrate the practice of our invention.

EXAMPLE I

In each of the following examples the following amounts of reactive materials were employed:

| | Grams |
|---|---|
| Caprolactam | 300 |
| Sodium hydride (dispersed in 0.76 gram mineral oil) | 1.0 |
| PAPI | 3.6 |

This weight of sodium hydride amounted to 1.58 mole percent of the caprolactam or about 0.33 weight percent. This weight of PAPI provided about 1.02 equivalent percent of isocyanate and amounted to about 1.2 weight percent.

To obtain a reference material for purposes of comparison with plasticized samples, a plasticizer-free nylon-6 slab was cast as follows and its impact strength determined. 1.76 grams of an oil dispersion of sodium hydride were dissolved in 100 grams of caprolactam by heating the mixture at a temperature of 140° C. 3.6 grams of polymethylene-polyphenyl isocyanate were dissolved in a separate portion of 200 grams of caprolactam by heating this mixture at 140° C. until a solution was obtained. The catalyst containing- and cocatalyst containing-monomer portions were then mixed thoroughly and poured into a mold which had been preheated to 160° C. The mold was placed in an oven maintained at 160° C. for four minutes. The mold was subsequently removed. The mold had been arranged and constructed to form a molded or cast slab of nylon-6 approximately one-half inch by six inches by six inches in dimensions. The slabs were cut into strips suitable for the ASTM D–256 impact strength test. Strips were obtained from the cast slab which were one-half inch by one-half by two and one-half inches in overall dimensions. The impact strength of a number of these strips was measured in accordance with ASTM D–256 and an average value of 1.1 foot/pounds per inch of notch was obtained.

EXAMPLE II

As in Example I, a total of 300 grams of caprolactam were taken for polymerization. To a 100 gram portion of the monomer, 1.0 gram of sodium hydride dispersed in oil was added and heated at 140° C. until a solution was obtained. To the other 200 gram portion of caprolactam, 3.6 grams of PAPI were added and dissolved at 140° C. 16 grams of Pluronic F68, a block copolymeric polyoxypropylene-polyoxyethylene glycol of the type described, was added to the 200 gram portion of caprolactam. This block copolymeric glycol has an overall average molecular weight of 8,750 and contains about 80% by weight polyoxyethylene. As soon as the plasticizer had dissolved in the one portion of caprolactam, the two portions were mixed and added to a mold as employed in Example I which had been preheated to 160° C. The mold was placed in an oven controlled at 160° for four minutes. The mold was then removed from the oven and the cast slab demolded. Specimens suitable for ASTM impact strength test D–256 were cut from the molded slab. A number of these strips were notched and tested for impact strength. The average value of the impact strength was 2.0 foot/pounds per inch of notch. It is seen that the impact strength of the plasticized specimens produced in accordance with our invention are significantly higher than the 1.1 foot/pounds per inch of notch obtained with unplasticized material prepared as in Example I.

EXAMPLE III

In this example exactly the same amounts of caprolactam, sodium hydride and PAPI were employed as in the above examples. However, in this case 33 grams of Pluronic F68 plasticizer polyol were employed instead of the 16 grams of Example II. Thus, the total amount of plasticizer employed in this example amounted to just over 10% by weight of the polymerizable caprolactam-catalyst-cocatalyst mixture. A slab was molded at 160° C. as in Example II and strips were cut from the molded slab suitable for impact testing in accordance with ASTM designation D–256. The average value of the impact strength of these strips was found to be 2.5 foot/pounds per inch of notch.

EXAMPLE IV

A 300 gram portion of caprolactam was divided into two portions. Sodium hydride catalyst as in the above example was added to one, PAPI cocatalyst was added to the other larger portion. In this instance, Tetronic T707 block copolymeric polyoxypropylene-polyoxyethylene tetrapolyol was employed as the plasticizer. This polyol has an average molecular weight of about 12,000. 16 grams of this material were employed, amounting to about 5% by weight of the caprolactam-catalyst-cocatalyst mixture. The cast slab was formed as in the above Examples II and III and strips cut therefrom for impact strength tests. The average impact strength of these plasticized strips was found to be 2.0 foot/pounds per inch of notch.

EXAMPLE V

The same plasticizer and reactive materials as were employed in Example IV were used herein except that a total of 33 grams of plasticizer was employed. This quantity of plasticizer amounted to about 10% by weight of the reactive components of the formulation. The average impact strength of the resulting material was found to be 2.7 foot/pounds per inch of notch.

EXAMPLE VI

In this example the same quantities of caprolactam, sodium hydride and PAPI were employed as were used in the above examples. However, in this instance 16 grams of a polyethylene glycol, known as "Carbowax 20M" (a product of Union Carbide Corporation), having an average molecular weight of about 15,000, were incorporated as the plasticizer. A cast slab was molded at 160° C. in about four minutes as in the above examples. The impact strength of strips produced from the cast slab were found to have an average value of 1.9 foot/pounds per inch of notch.

EXAMPLE VII

A mixture of high molecular weight polyethylene glycol, caprolactam, sodium hydride and PAPI were prepared as in Example VI except that the content of the polyethylene glycol was increased to about 10%. 33 grams were employed. The average impact value of the strips produced from the cast slab was found to be 2.2 foot/pounds per inch of notch.

Thus it is seen that polyoxyalkylene polyols of the type described may be incorporated into a polymethylene polyphenyl isocyanate cocatalyzed-caprolactam mixture and the mixture polymerized by a low temperature anionic polymerization process to produce high molecular weight nylon-6 polymers having relatively high notched impact strength values. When desired, the reactive polymerization mixture may be poured into a mold of suitable configuration and a cast plasticized article produced having high impact strength properties.

We have found that many conventional nylon plasticizers and other candidate liquids or solids are unsuitable for use in polymerizing caprolactam mixtures because they inhibit the polymerization reaction. Examples of these materials which have been tried and found not to work are aryl sulfonamide-formaldehyde resins of the type commercially available under the trade name "Santolite MHP," N-cyclohexyl paratoluenesulfonamide, N-ethyl-p-toluenesulfonamide and mixtures of ortho and para toluenesulfonamides. Other materials, such as polyvinyl pyrrolidone, chlorinated hydrocarbons, commercially available as plasticizers and known as Chlorowax 40 and 70, and other materials were mixed in with the caprolactam monomer, catalyst and cocatalyst in an attempt to plasticize or control the crystallinity of the resulting nylon-6 and thereby increase its impact strength. All of these additives were found either to inhibit the polymerization reaction or be otherwise ineffective.

While our invention has been described in terms of a few specific examples thereof, it will be appreciated that other forms could readily be adapted by one skilled in the art. Accordingly, our invention is to be considered limited only by the scope of the following claims.

What is claimed is:

1. A method of polymerizing epsilon-caprolactam in the presence of a suitable plasticizer to form a high impact strength nylon-6 comprising providing a mixture of epsilon-caprolactam, a caprolactam-base salt anionic catalyst, polymethylene polyphenyl isocyanate cocatalyst, sufficient cocatalyst being employed to supply 0.1 to about two equivalent percent of isocyanate groups based on said caprolactam, and a small amount, up to no more than about 15% by weight, of the total of said caprolactam, catalyst and cocatalyst of a polyoxyalkylene polyol taken from the group consisting of polyoxyethylene glycols having a molecular weight in the range of about 6,000 to 20,000 polyoxypropylene glycols having a molecular weight in the range of about 2,000 to 4,000 and block copolymeric polyoxypropylene-polyoxyethylene polyols having a molecular weight of 3,000 to 14,000, heating said mixture at a temperature of about 150° to 200° C. to polymerize said caprolactam and produce nylon-6 plasticized with a said polyoxyalkylene polyol and subsequently cooling said plasticized nylon-6.

2. A method of polymerizing epsilon-caprolactam in the presence of a suitable plasticizer to form a high impact strength nylon-6 comprising polymerizing a mixture of epsilon-caprolactam, a caprolactam-base salt anionic catalyst and polymethylene polyphenyl isocyanate cocatalyst, sufficient cocatalyst being employed to supply 0.1 to about two equivalent percent of isocyanate groups based on said caprolactam, in the presence of about 5% to no more than about 15% by weight of the total of said caprolactam, catalyst and cocatalyst of a polyoxyalkylene polyol taken from the group consisting of polyoxyethylene glycols having a molecular weight in the range of about 6,000 to 20,000, polyoxypropylene glycols having a molecular weight in the range of about 2,000 to 4,000 and block copolymeric polyoxypropylene-polyoxyethylene polyols having a molecular weight of 3,000 to 14,000 at a temperature of about 150° to 200° C. to produce a nylon-6 article plasticized with a said polyoxyalkylene polyol and subsequently cooling said plasticized nylon-6 article.

3. A method of simultaneously polymerizing and casting epsilon-caprolactam in the presence of a suitable plasticizer to form a molded, high impact strength nylon-6 article of suitable configuration comprising providing a mold defining a cavity therein of suitable predetermined configuration, heating said mold to a temperature in the range of 150° to 200° C., adding to said mold a mixture of epsilon-caprolactam, a caprolactam-base salt anionic catalyst and polymethylene polyphenyl isocyanate cocatalyst, sufficient cocatalyst being employed to supply 0.1 to about two equivalent percent of isocyanate groups based on said caprolactam, and a small amount, up to no more than about 15% by weight, of the total of said caprolactam, catalyst and cocatalyst of a polyoxyalkylene polyol taken from the group consisting of polyoxyethylene glycols having a molecular weight of about 6,000 to 20,000, polyoxypropylene glycols having a molecular weight of 2,000 to 4,000 and block copolymeric polyoxypropylene-polyoxyethylene polyols having a molecular weight in the range of about 3,000 to 14,000, heating the contents of said mold at a temperature of 150° to 200° C. until a polymerized nylon-6 article has been formed and removing said article from said mold.

References Cited
UNITED STATES PATENTS

| | | | |
|---|---|---|---|
| 3,308,099 | 3/1967 | Mermoud et al. | 260—78 L |
| 3,423,372 | 1/1969 | Steely | 260—78 L |
| 3,470,139 | 9/1969 | Marshall et al. | 260—78 L |
| 3,704,280 | 11/1972 | Van der Loos et al. | |
| | | | 260—77.5 AM |

WILLIAM H. SHORT, Primary Examiner

L. M. PHYNES, Assistant Examiner

U.S. Cl. X.R.

260—33.4 R, 37 N, 77.5 AM, 78 L, 858; 264—176 R